United States Patent [19]
Hjorth

[11] 3,725,690

[45] Apr. 3, 1973

[54] APPARATUS FOR EVALUATING A SIGNAL

[75] Inventor: Bo Hjorth, Sollentura, Sweden

[73] Assignee: Siemens Aktiengesellschaft, Berlin, Germany

[22] Filed: Dec. 11, 1970

[21] Appl. No.: 97,229

[30] Foreign Application Priority Data

Dec. 11, 1969 Sweden .............................. 17159/69

[52] U.S. Cl. ............... 235/183, 235/197, 235/151.3, 128/2.1 B
[51] Int. Cl. ............................. G06g 7/18, A61b 5/04
[58] Field of Search ...... 235/181, 183, 151.3, 151.51, 235/197; 324/77 A, 77 B, 77 D; 128/2.1 B

[56] References Cited

UNITED STATES PATENTS

| | | | |
|---|---|---|---|
| 2,994,822 | 8/1961 | Isley, Jr. ............................. | 235/183 X |
| 3,123,768 | 3/1964 | Burch et al. ......................... | 324/77 A |
| 3,124,745 | 3/1964 | Schroeder ........................... | 324/77 B |
| 3,185,925 | 5/1965 | Grass ................................. | 324/77 D |
| 3,222,598 | 12/1965 | Pollard .............................. | 324/77 D |
| 3,413,546 | 11/1968 | Riehl et al. .......................... | 128/2.1 B |

*Primary Examiner*—Felix D. Gruber
*Attorney*—Richards & Geier

[57] ABSTRACT

Apparatus to determine directly from a signal the frequency which represents the standard deviation in the output spectrum of the signal as well as the ratio between the standard deviation of the output spectrum of the derived signal and the above-mentioned standard deviation in the output spectrum of the original signal. The invention is particularly characterized in that the standard deviation or variance of the derived signal is divided by the standard deviation or variance of the original signal, and in that the standard deviation or variance of the twice derived signal is divided by the standard deviation or variance of the single derived signal, whereupon the quotient produced by this procedure is divided by the quotient (standard deviation frequency) produced by the first-mentioned procedure.

1 Claim, 2 Drawing Figures

APPARATUS FOR EVALUATING A SIGNAL

This invention relates to a process and a device for evaluating a signal, for example, that of an electrical voltage variable in time, whereby the purpose is to determine the general character of the signal by determining its important characteristics in the spectral distribution. The precise relationship between the signal and a frequency inscription is mathematically defined by a so-called Fourier transformation, which always provides a distribution symmetrical to the frequency zero, namely two identical mirror-like divisions, one related to the positive frequency and the other to the negative frequency. In certain situations the negative half of the division is disregarded, since in practice one cannot differentiate between positive and negative frequency.

An example of the art in which an evaluation of the above-described type is important is the electroenzephalography, which is the registration of electrical voltages from the brain crust produced by the activity of the nervous system. In methods now in use a division of the frequency content of a signal is built up in frequency classes by the use of frequency selective filters. A more recent method consists in calculating from a voltage curve by means of a computer a very precise frequency distribution. Properties of the distribution relevant for the evaluation consist in general of descriptive characteristics of static nature. This means that the evaluation, irrespective as to whether it is carried out by filter technology or with computers, is carried out in two steps namely, initially a frequency analysis and then a description of the obtained frequency distribution.

Hereinafter the term "frequency distribution" is used to designate a description for the time function during a specific internal, whereby each frequency is represented by a value which corresponds to the square of the amplitude of the corresponding sinus oscillation. The distribution is then according to customary conceptions a so-called output spectrum.

An object of the present invention is to make it possible to calculate directly from the signal, that is, without (Fourier) frequency analysis, the characteristic freuency for the distribution, as well as a numerical value giving the dispersion of the distribution about that frequency.

Other objects will become apparent in the course of the following specification.

It should be noted that the characteristic frequency corresponds to the standard deviation of the distribution, whereby the distribution is to be considered as being symmetrical about the frequency zero in conformity with the complete mathematical description. The degree of dispersion is indicated as a factor which in case of a discrete frequency (sinus shape) has the value 1 and in case of deviations from the sinus shape or in case of simultaneous appearance of sinus waves of different frequencies has values higher than 1 and thus quantitatively indicates the deviation from the sinus shape or, when stated as frequency, provides a measure for the frequency dispersion.

The present invention is based on the consideration that the square of the frequency which corresponds to the standard deviation of the output spectrum can be calculated from the output spectrum, whereby the variance in the output spectrum is expressed as a ratio between two outputs both of which can be calculated from the output spectrum. The present invention is also based on the fact that these outputs with the help of the Fourier transformation can attain a meaning as the average output of the time differential deviation of the signal or as the average output of the signal. The process of the present invention thus represents the ratio between two outputs directly measured from the signal as a square measure of an average frequency characteristic for the output spectrum, without it being necessary to carry out a determination of the output spectrum. In the same manner the quotient (i.e., the ratio) between the outputs of the second derivation of the signal resp. of the first derivation is produced. This quotient is divided by the just produced variance of the output spectrum, whereby the above-mentioned dispersion degree is obtained.

An apparatus for carrying out the process of the present invention can contain devices for forming the time derivation of the signal, devices for squaring the momentary values, devices for summing up the squared momentary values and devices for carrying out the division of sums thus produced and the division of the produced quotients.

Among others, the present invention is suitable for use in the automatic analysis of EEG (electro-enzephalograms), whereby the sample character of the EEG curve is described by its output content, average frequency and the dispersion of the frequency content about it.

The invention will appear more clearly from the following detailed description when taken in connection with the accompanying drawings showing by way of example only, a preferred embodiment of the inventive idea.

Figure 1:
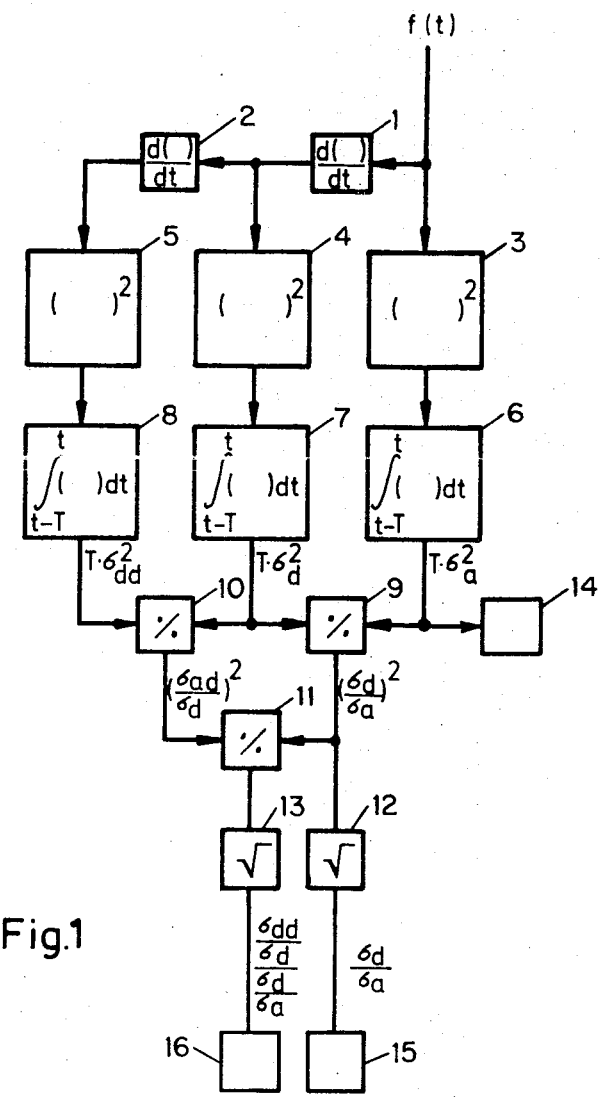
FIG. 1 is a block diagram.

FIG. 1 illustrates an apparatus for determining directly from an electrical signal $f(t)$, such as an EEG-signal, parameters giving a measure of the average amplitude, the corresponding average frequency and the average dispersion of the frequency distribution about that frequency in the output spectrum of the signal during a specific time interval T. The apparatus includes a first differentiation member 1 receiving the electrical signal and used for the differentiation of the signal. A second differentiation member 2 is connected with the first differentiation member 1 and is used for the differentiation of the output signal of the member 1. There are three squaring members 3, 4 and 5. The first squaring member 3 is used for squaring the electrical signal. The second squaring member 4 is connected with the first differentiation member 1 and is used for squaring its output signal. The third squaring member 5 is connected with the second differentiation member 2 and is used for squaring its output signal. Three integration members 6, 7 and 8 are connected with the three squaring members 3, 4 and 5, respectively and are used for the integration of their output signals over the specific time interval T. There are also three dividing members 9, 10 and 11. The first dividing member 9 is connected with the first and second integration members 6 and 7 and is used for the division of their output signals. The second dividing member 10 is connected with the second and third integration members 7 and 8 and is used for the division of their output signals. The third dividing member 11 is connected with the two dividing members 9 and 10 and is used for the division of their output signals. There are also two square root members 12 and 13. The first square root member 12 is connected with the first dividing member 9 and is used for calculating the square root of its output signal. The second square root member 13 is connected to the third dividing member 11 and is used for calculating the square root of its output signal. An indicating device 14 connected with the first integration member 6, indicates its output signals. Similar indicating devices 15 and 16 are connected with the square root members 12 and 13, respectively.

Indicia located at the outlets of boxes shown in FIG. 1 show electrical signals appearing at these outlets.

The present invention can be advantageously carried out with the use of digital circuit technology, particularly when analyzing simultaneously several EEG-deviations.

Figure 2:
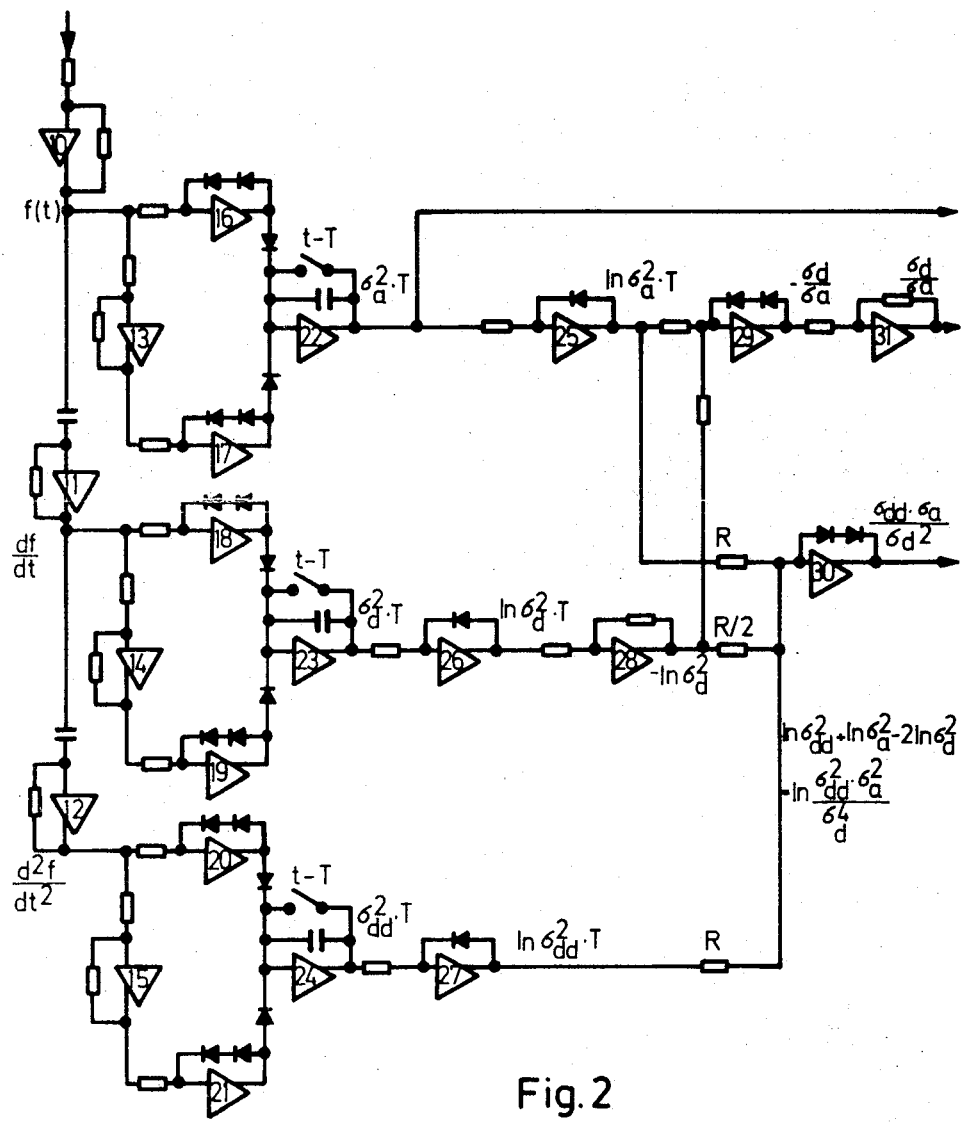
FIG. 2 illustrates an electric circuit diagram of the apparatus of the present invention.

However, to simplify the description of the operation FIG. 2 shows an example of an analog circuit embodiment. All triangles shown in FIG. 2 and having the numerals from 10 to 31 represent phase reversing operational amplifiers. Amplifier 10 produces the signal $f(t)$ which is to be analyzed. After the amplifier 11 the first derivation of $f(t)$ is formed and after the amplifier 12 the second derivation. Amplifiers 13, 14 and 15 merely reverse the phase. Amplifier pairs 16, 17, 18, 19 and 20, 21 carry out partially a two way rectification (amount formation) and partially a logarithm calculation in such manner that the corresponding pair produces the double logarithm, namely, the logarithm of the square of the signal. In adjacent diodes exponent formation (anti-logarithm formation) is carried out in such a manner that currents introduced into members 22, 23 and 24 correspond to the squares of voltages of the corresponding blocks 10, 11 and 12. Amplifiers 22, 23 and 24 are connected as integrators which integrate and square during a predetermined time interval T. Logarithms of corresponding integrals are produced in members 25, 26 and 27 and by variance formation and power raising in members 29 and 30 the desired squares are produced in conformity with the block diagram of FIG. 1.

The result of analysis of each interval can be written out by a writing system common for the EEG registration or as a special series of measuring values.

In order to be able to combine a larger number of intervals, that is, to provide a longer registration, it is advantageous to calculate the averages and variation coefficients for the values measured by intervals. A description of this type with the assitance of a small number of combining values for each EEG derivation is suitable for an analysis of a plurality of derivations.

The patern character of a complex signal is determined by calculating the average frequency and frequency dispersion of the signal.

I claim:

1. An apparatus for determining directly from an electrical signal $f(t)$, such as an EEG-signal, parameters giving a measure of the average amplitude, the corresponding average frequency and the average dispersion of the frequency-distribution about that frequency in the output-spectrum of said signal during a specific time interval T, said apparatus comprising a first differentiation member 1 for the differentiation of said electrical signal, a second differentiation member 2 for the differentiation of the output-signal of the first differentiation member 1, three squaring members 3, 4, 5, the first squaring member 3 for squaring said electrical signal, the second for squaring the output signal of the first differentiation member 1 and the third for squaring the output signal of the second differentiation member 2, a first, second and third integration members 6, 7, 8 for the integration of the output signals os the first, second and third squaring members 3, 4, 5 over said specific time interval T, a first dividing member 9 for the division of the output signals of the second and first integration members 7, 6, a second dividing member 10 for the division of the output signals of the third and second integration members 8, 7, a third dividing member 11 for the division of the output signals of the second and first dividing members 10, 9, a first square root member 12 for calculating the square root of the output signal of the first dividing member 9, a second square root member 13 for calculating the square root of the output signal of the third dividing member 11 and means 14, 15, 16 for indicating the output signals of the first integration member 6 and of each square root member 12, 13.

* * * * *